June 2, 1964
G. H. MORRIS
3,135,338
ROTARY ROD WEEDER
Filed July 30, 1962
4 Sheets-Sheet 1
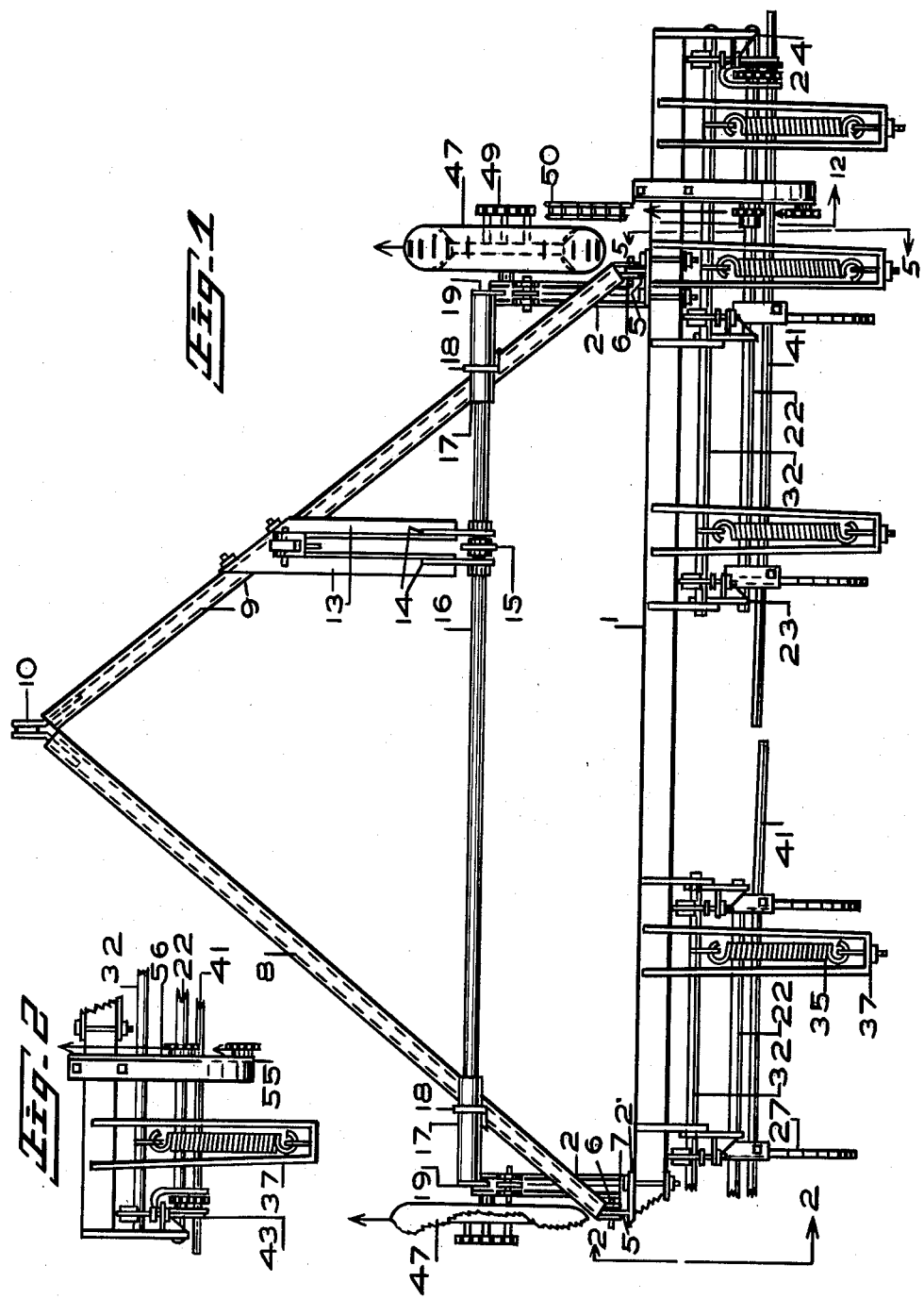

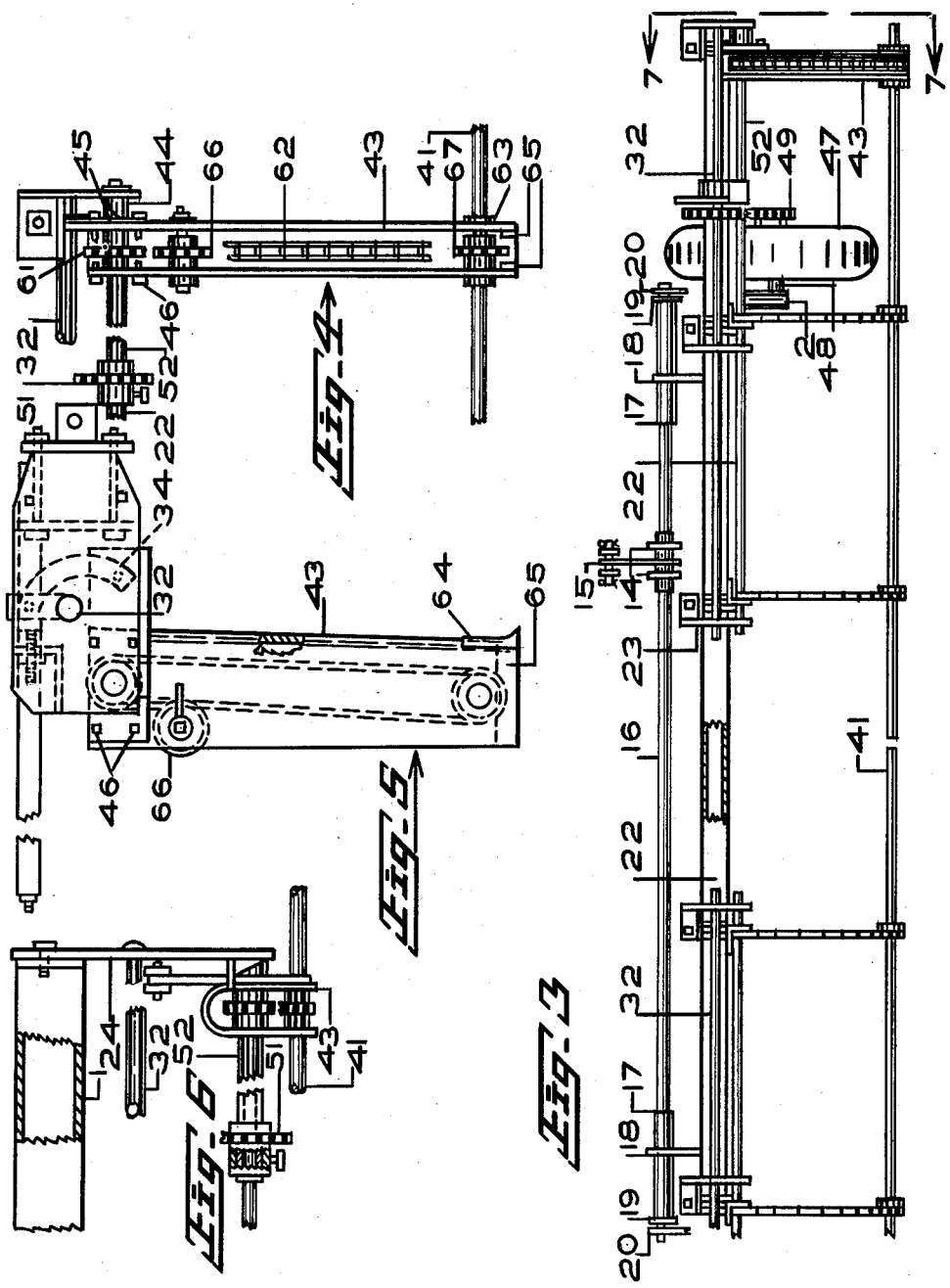

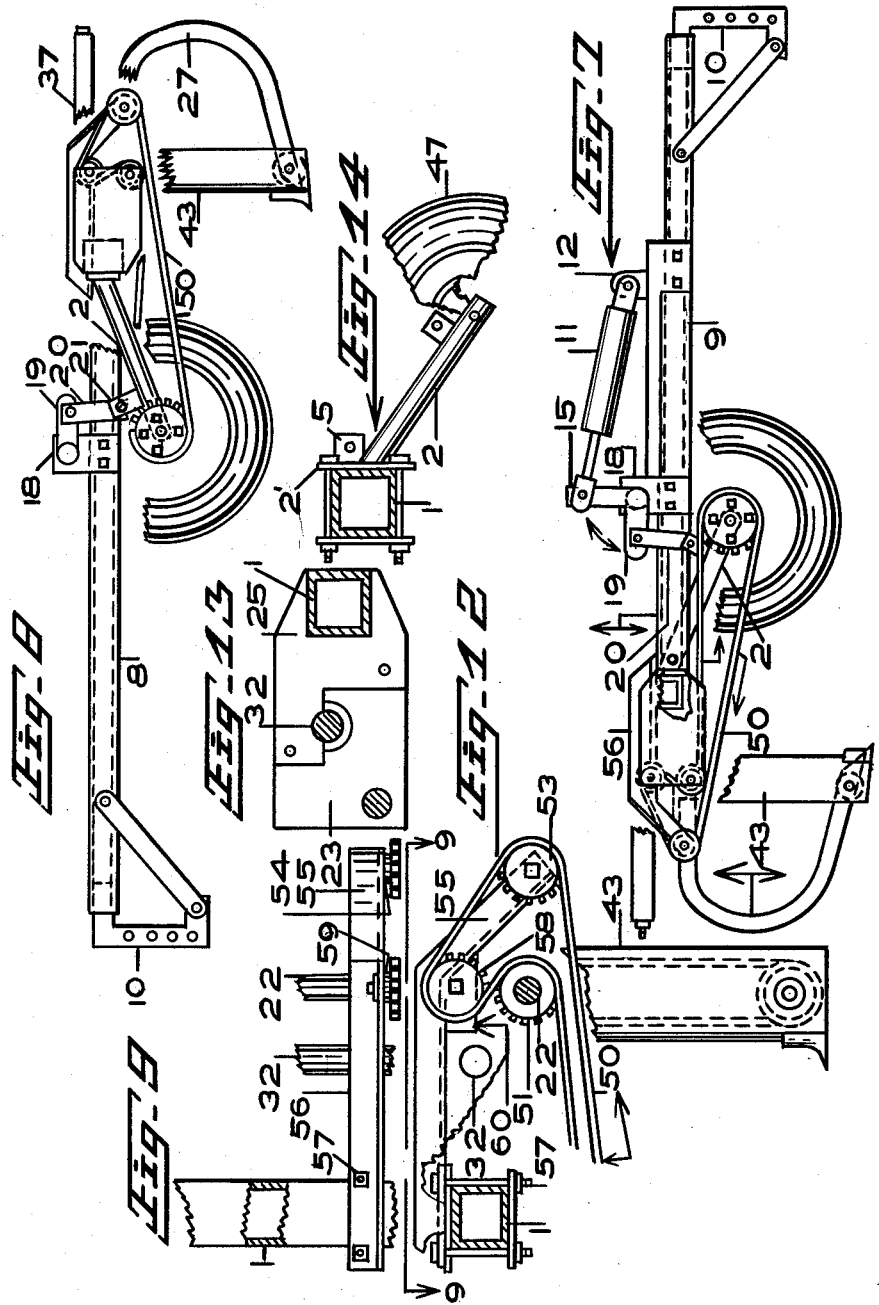

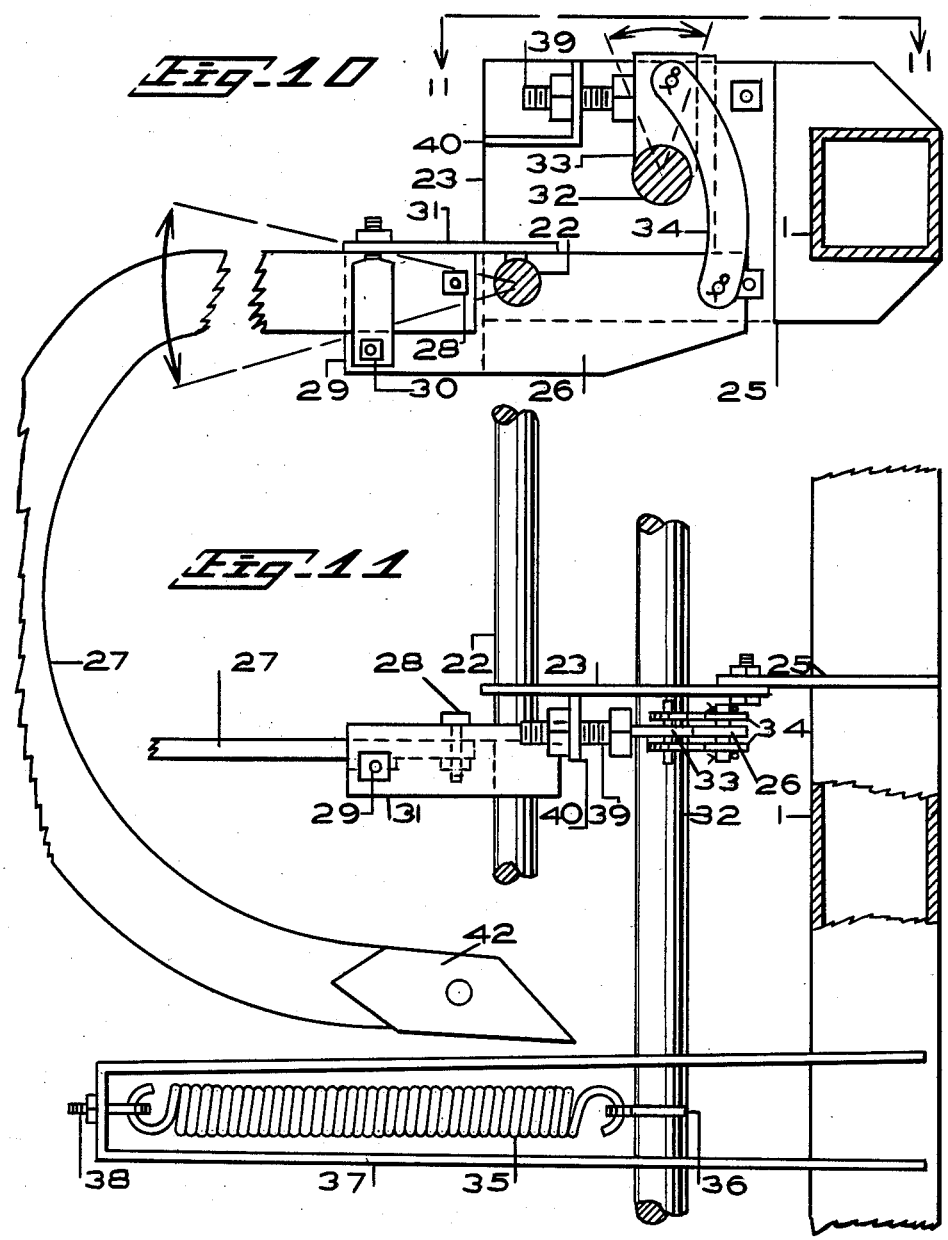

United States Patent Office 3,135,338
Patented June 2, 1964

3,135,338
ROTARY ROD WEEDER
George Henry Morris, 37 6th Ave. N., Yorkton, Saskatchewan, Canada
Filed July 30, 1962, Ser. No. 213,193
4 Claims. (Cl. 172—44)

This invention relates to rotary rod weeders, having particular reference to a new improved bar type frame weeder with a leg drive.

The use of a leg drive for the rod of a rotary rod weeder is not in itself considered new, and the present invention is concerned with improvements in the design and construction of a weeder embodying a leg drive that permits of its use as a single unit to be drawn by a tractor, or two or more such units may be connected end to end for wider coverage. Additionally the hitch and wheel assemblies of my improved weeder can be removed and the weeding elements mounted on a deep tillage cultivator with a drive for the rotary rod from the wheels of the cultivator, or by an independent drive arrangement.

Further, the rod weeder can be used as a mounted rod weeder on a tractor equipped with a three point hitch using a reduction gear drive operated by the tractor power take off, delivering power for operation of the single or double drive.

The present device is associated with a leg type of drive for the weeder rod, which places the wheels and drive inward of its working width, an advantage for travel on roads, and also for working close to fences or bush, as well as for connecting two or more weeders end to end.

The working elements for the weeder are carried on a single transverse beam mounted on supporting wheels in relation to which it is pivoted to be movable vertically for raising and lowering the working elements by hydraulic means. The shanks mounting the weeder rod are spring held in working relation to the ground and are adjustable as to tension and working depth, and they are also capable of swinging back as a unit when an obstruction is encountered by one of the shanks or the rod, or a leg drive, and to automatically swing back into normal working position when the obstruction is cleared. The shanks and legs are also free of downwardly extending arms, giving maximum trash clearance.

Other features and advantages of the invention will be made apparent in the accompanying description taken in conjunction with the drawings.

In the drawings, wherein is illustrated a preferred embodiment of the invention, FIG. 1 is a top plan view of the implement, shown with parts broken away, and illustrating two weeder rod assemblies combined as a single unit with separate drives.

FIG. 2 is a detail view showing parts of the left weeder assembly that are broken away in FIGURE 1 and as indicated by the arrows of the dashed line 2—2.

FIG. 3 is a rear elevation of the machine, with parts omitted for convenience of illustration and shown partly broken away.

FIG. 4 is a detail enlarged rear view showing the leg drive for the weeder rod, including the mounting for the leg plate and the driving connection to the gang shaft sleeve and from the sleeve to the weeder rod, shown with parts broken away.

FIG. 5 shows a side view of the leg drive, including the mounting for the protecting leg plate and a rear rocker shaft spring holding bracket, shown in part as broken away, FIG. 6 is a top view of the leg drive and connecting element, including the mounting for the protecting plate, and the drive connection, shown broken away in parts and in part sectioned.

FIG. 7 is a side view of the implement taken from the right side, as from a line 7—7 of FIGURE 3, showing the drive connection from the wheel for the weeder rod, and the hydraulic element with its connection to a wheel bracket arm, with parts shown broken away.

FIG. 8 is a side view of the implement taken from the left side and similar to the showing in FIGURE 7 but with the hydraulic element omitted.

FIG. 9 is a top plan view taken on a line 9—9 of FIGURE 12, showing the mounting bracket for the gang shaft sleeve driving connection from the wheel, and including fragments of the frame bar and the rear rocker shaft and the gang shaft.

FIG. 10 is a side view of a weeder shank and including the mounting for the shank on the rear rocker shaft and the connections for the shaft mounting to the gang shaft and frame beam, shown as in part broken away and in part sectioned.

FIG. 11 shows a top plan view of the shank mounting, taken on a line 11—11 of FIGURE 10, shown with the shank and other parts broken away, and in part sectioned.

FIG. 12 is a side view taken from the left side of the implement and showing the mounting for the weeder rod drive connections from the wheel, with parts broken away and parts in section.

FIG. 13 is a side view taken from the right side of mounting plates for the gang shaft and rear rocker shaft, shown in attachment to the beam, with the shafts and beam shown in section.

FIG. 14 is a side view taken from the right side of the machine showing attachment of the wheel bracket arm on the implement beam, with the latter shown in section, and including a fragment of the wheel.

Having reference to the drawings, the implement has its working elements carried on a cross beam 1 that is clamped to plates 2' (FIGS. 1–14) to which are welded bracket arms 2 that have axles 48 (FIG. 3) attached thereto mounting for rotation wheels 47.

Attached on the plates 2' are coupling lugs 5 (FIGS. 1 and 14) engaged by pins 6 (FIG. 1) in lugs 7 on the ends of draft bars 8 and 9 that forwardly extend and have attached thereto a bridle 10.

For raising and lowering the beam 1 a hydraulic element 11 is used anchored to a lug 12 (FIG. 7) mounted between angle irons 13 (FIG. 1) that are forwardly attached to the draft bar 9 and have rearwardly attached thereto link plates 14 that attach to collars 14' in which a rocker shaft 16 is mounted free to turn, the rocker shaft having an upstanding arm 15 fixed thereto and to which the end yoke of the hydraulic element is pivotally attached. The rocker shaft 16 is mounted free to turn in sleeve 17 mounted by brackets 18 on the draft bars 8 and 9.

The rocker shaft 16 has rearwardly extending arms 19 (FIGS. 1–7–8) fixed thereto and pivotally connected by links 20 to lugs 21 on the bracket arms 2.

In the present showing a two section weeder is disclosed, and it is to be understood that the description that follows is relative to the right end section, but that similar working parts would be provided for the left end section and with the beam 1 common to both sections.

On the beam 1 is carried for each section a gang shaft 22 free to turn axially in rearwardly extending intermediate plates 23 and end plates 24 (FIGS. 1, 4 and 6) attached to the beam 1, the end plates attaching, as by cap screws (FIG. 6) to the outer end of the beam, and the intermediate plates attaching bolted (FIGS. 10–13) to plates 25 that are fixed, as by welding, to the beam 1.

On the gang shaft 22 are attached fixed thereto shank mounting brackets 26 (FIG. 10) to which shanks 27 are attached by bolts 28 and further clamped by eye bolts 29 to the brackets 26, the eye bolts engaging a wing 31 of the bracket. The eye bolts further have their head ends clamped to the bracket 26 by bolts 30.

Also mounted in the plates 23 and 24 is a rear tubular rocker shaft 32 rotatable therein and on which are upstanding arms 33 fixed to the rocker shaft and each pivotally connected by links 34 to mounting brackets 26 and 45 (FIGS. 10, 11, 4 and 5), so that if any shank swings backward and upward when avoiding an obstruction, the gang shaft 22 is turned axially and by its connecting links 34 and arms 33 turns the rocker shaft 32 so that all the shanks of the section move as a unit, since each shank is similarly connected to its section rocker shaft.

The shanks are held forwardly by springs 35 (FIG. 11) which are adjustably attached by eye bolts 38 to brackets 37 mounted on which are the springs and the beam 1, with the forward ends of the springs 35 attached to arms 36 (FIG. 11) on the rocker shafts 32, the arms 36 extending upward and rearwardly.

The springs 35 are tensioned to hold the upstanding arms 33 on the rear rocker shafts 32 normally bearing against trip adjusting bolts 39 for the shanks (FIGS. 10–11) engaging threaded in brackets 40 on the plates 23, the locking adjustment of the trip being variable by adjustment of the bolts 39.

A rotary rod 41 for each section is carried mounted for rotation in replaceable hardened shoes 42 on the shanks 27 (FIG. 10). These rods are also each supported by a leg drive including a leg plate 43 attached suspended by a flanged collar 44 (FIG. 4) keyed and set screwed to the gang shaft 22, the flange 45 of the collar attaching to the leg by bolts 46, the flange and collar functioning as a bracket similar to the bracket 26 and pivotally connected to a rocker shaft arm 33 by a link 34 (FIGS. 5 and 10).

For driving the rotary rods, each of the two supporting wheels 47 mounted to turn on the stub axles 48 (FIG. 3) that are carried by the bracket arms 2 has fixed thereto a sprocket 49 connected by a chain 50 (FIG. 1) in driving relation to a sprocket 51 on a sleeve 52 (FIG. 4) free to turn on the gang shaft 22. The chain 50 (FIGS. 9–12) is passed over an idler sprocket 53 on a stub shaft 54 carried by a depending arm 55 of a bracket 56 clamped by bolts 57 (FIG. 12) to the beam 1, and then over a further idler sprocket 58 on a stub shaft 59 mounted in a depending lug 60 on the bracket 56. By this the sprocket 51 is turned oppositely to the wheels 47.

The rotary rod is driven from the sleeve 52 by a sprocket 61 (FIG. 4) through a chain 62 in driving relation to a sprocket 67 on the rod 41, this rod mounting rotatable in replaceable hardened bearing 63 in the leg 43. The leg further includes hardened points 64 and side plates 65 attached removable thereon.

The leg 43 is attached to the gang shaft 22 operating in a manner similar to the shanks 27, as shown in dashed lines in FIGURE 5. For this a pair of links 34, as shown in the dashed lines, attach to the flange 45 on the collar 44.

The chain 62 is engaged by a tightener sprocket 66 (FIGS. 4 and 5) mounted in the leg 43.

In the use of the implement, as herein shown two unit assemblies are provided, each having a weeder rod 41 separately driven from the wheels 47.

The hydraulic element 11, by its connection to the control rocker shaft 16, is used for raising and lowering the beam 1 on its supporting wheels, the hydraulic element connecting by the upstanding arms 15 to the rocker shaft, which latter attaches by the links 19 and 20 to the lugs 21 on the bracket arms 2 in which the stub axles 48 of the wheels are mounted, this raising and lowering the shanks carried by the beam 1.

The rear rocker shafts 32 (FIG. 11) have the springs 35 connected thereto by the arms 36, and these shafts connect by the links 34 (FIG. 10) to the shanks 27 and the legs 43, so that when an obstruction is encountered either by the shanks, or the legs or weeder rod, all the shanks and the legs of the section affected swing rearwardly and upwardly together, avoiding strain on the rods. The tension of the springs 35 may be separately adjusted by the bolts 38, and the trip adjustment of the shanks 27 and legs 47 may be made by the bolts 39 (FIGS. 10–11).

The embodiments of the invention in which an exclusive property or privilege is claimed are defined as follows:

1. In a rotary rod weeder having a cross beam and a pair of arms fixed to said beam, and including supporting wheels for the beam mounted on axles fixed to said arms, a pair of gang shafts, plates fixed to the cross beam and in which the gang shaft are mounted free to turn axially and axially aligned, a series of rotary rod carrying shanks mounted fixed to each gang shaft, a sleeve free to turn on each gang shaft, sprocket and pinion means connecting the wheels in driving relation to the sleeves, and sprocket and pinion means connecting each of the sleeves in driving relation to a rotary rod carried by the shanks.

2. In a rotary rod weeder as set out in claim 1, a rocker shaft transversely mounted to turn in the plates on the cross beam parallel with said beam, laterally projecting arms fixed to the rocker shaft one for each shank in opposing relation to the shanks, and links pivotally connecting the shanks and laterally projecting arms by which upward movement of a shank turns the rocker shaft and imparts a similar movement to the other shanks.

3. In a rotary rod weeder as set out in claim 2 and including a leg plate for each of the driving connections between the sleeves and rotary rods, said sleeves passing through the leg plate with said plates free to turn on the sleeves, a collar fixed on each gang shaft, a flange fixed to the collar and attached to a leg plate, a laterally projecting arm on each rocker shaft for each leg plate, and links connecting said arms to the flanges on the collars with the leg plates turned thereby corresponding to the movement of the shanks when the gang shaft is turned.

4. In a rotary rod weeder as set out in claim 2 brackets fixed to the cross beam rearwardly extending, radially extending arms fixed to the rocker shaft one for each of said brackets, and a spring connecting each of said arms to the outer end portion of a bracket tensionable by an axially turning movement of the rocker shaft.

References Cited in the file of this patent

UNITED STATES PATENTS

| | | |
|---|---|---|
| 2,055,388 | Rhodes | Sept. 22, 1936 |
| 2,699,714 | Fundingsland | Jan. 18, 1955 |
| 2,954,085 | Roberts | Sept. 27, 1960 |